(12) United States Patent
Hong et al.

(10) Patent No.: US 11,868,401 B2
(45) Date of Patent: Jan. 9, 2024

(54) ELECTRONIC DEVICE AND METHOD FOR ACQUIRING SIZE OF FILE OR DIRECTORY STORED IN FILE SYSTEM

(71) Applicant: Samsung Electronics Co., Ltd., Gyeonggi-do (KR)

(72) Inventors: Jongwoo Hong, Gyeonggi-do (KR); Sungjong Seo, Gyeonggi-do (KR); Sunghwan Yun, Gyeonggi-do (KR); Kitae Lee, Gyeonggi-do (KR); Woojoong Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 13 days.

(21) Appl. No.: 17/682,788

(22) Filed: Feb. 28, 2022

(65) Prior Publication Data

US 2022/0179907 A1    Jun. 9, 2022

Related U.S. Application Data

(63) Continuation of application No. PCT/KR2020/011545, filed on Aug. 28, 2020.

(30) Foreign Application Priority Data

Aug. 29, 2019  (KR) .................. 10-2019-0106527

(51) Int. Cl.
  *G06F 7/00*    (2006.01)
  *G06F 16/901*    (2019.01)
(52) U.S. Cl.
  CPC ............................... *G06F 16/9017* (2019.01)
(58) Field of Classification Search
  CPC ... G06F 16/9017; G06F 16/168; G06F 16/122

(Continued)

(56) References Cited

U.S. PATENT DOCUMENTS

2003/0163449 A1   8/2003  Iwano et al.
2007/0027929 A1*  2/2007  Whelan ............... G06F 16/1734

(Continued)

FOREIGN PATENT DOCUMENTS

JP   H 06-332769    12/1994
JP   2011-065314     3/2011

(Continued)

OTHER PUBLICATIONS

PCT/ISA/210 Search Report issued on PCT/KR2020/011545, dated Dec. 9, 2020, pp. 7.

(Continued)

*Primary Examiner* — Md I Uddin
(74) *Attorney, Agent, or Firm* — The Farrell Law Firm, P.C.

(57) ABSTRACT

Provided is an electronic device including a file system, a memory, and a processor. The memory stores at least one instruction that instructs, when executed, the processor to receive a request for access to a file or directory stored in a user data area of the file system. In response to the reception of the request, first information associated with the file or directory is store in the memory, and the size of the file or directory is displayed using the first information. When the first information is information associated with the file, the information indicates the size of the file. When the first information is information associated with the directory, the information indicates a sum of the sizes of all subdirectories and all files included in the directory.

18 Claims, 11 Drawing Sheets

(58) Field of Classification Search
USPC .................................. 707/648, 692, 769, 752
See application file for complete search history.

(56) References Cited

U.S. PATENT DOCUMENTS

| | | |
|---|---|---|
| 2007/0088674 A1 | 4/2007 | Kawate et al. |
| 2007/0179967 A1* | 8/2007 | Zhang .................... G06F 16/14 |
| | | 707/999.102 |
| 2011/0066666 A1 | 3/2011 | Takaoka et al. |
| 2014/0222972 A1 | 8/2014 | Thomas et al. |

FOREIGN PATENT DOCUMENTS

| | | |
|---|---|---|
| JP | 2016-024487 | 2/2016 |
| KR | 10-2006-0095549 | 8/2006 |
| KR | 10-2019-0047484 | 5/2019 |
| WO | WO 2018/089876 | 5/2018 |

OTHER PUBLICATIONS

PCT/ISA/237 Written Opinion issued on PCT/KR2020/011545, dated Dec. 9, 2020, pp. 5.

* cited by examiner

ELECTRONIC DEVICE AND METHOD FOR ACQUIRING SIZE OF FILE OR DIRECTORY STORED IN FILE SYSTEM

CROSS-REFERENCE TO RELATED APPLICATION(S)

This application is a Bypass Continuation application of International Application No. PCT/KR2020/011545, which was filed on Aug. 28, 2020, and is based on and claims priority under 35 U.S.C. § 119 to Korean Patent Application No. 10-2019-0106527, filed on Aug. 29, 2019, in the Korean Intellectual Property Office, the entire disclosure of each of which is incorporated herein by reference.

BACKGROUND

1. Field

The disclosure relates generally to an electronic device for acquiring the size of a file or directory stored in a file system and a method thereof.

2. Description of Related Art

With the recent development of digital technologies, various types of electronic devices such as mobile communication terminals, smart phones, tablet personal computers, electronic notebooks, personal digital assistants (PDAs), wearable devices, etc., are widely used. An electronic device can include at least one hardware component for storing various types of data.

An electronic device can include storage such as a hard disk and/or a flash memory. A plurality of files can be stored in the storage, based on a directory structure. When a user checks the size of a specific directory, the electronic device can display a result of adding the sizes of all files stored in the specific directory. However, when a large number of files are stored in the specific directory, it may take an excessive amount of time for the electronic device to add respective sizes of all the files.

SUMMARY

The disclosure has been made to address at least the above-mentioned problems and/or disadvantages and to provide at least the advantages described below.

An aspect of the disclosure is to provide an electronic device that includes a file system, a memory, and at least one processor. The memory may store at least one instruction for, when executed, enabling the at least one processor to receive a request for access to at least one of a file or a directory stored in a user data region of the file system; in response to receiving the request, store, in the memory, first information associated with the at least one of the file or the directory stored in the user data region; and display a size of the at least one of the file or the directory using the first information stored in the memory. When the first information is information associated with the file, the first information comprises information indicating the size of the file, and, when the first information is information associated with the directory, the first information comprises information indicating a sum of sizes of all subdirectories included in the directory and sizes of all files included in the directory.

Another aspect of the present disclosure provides a method for an electronic device, including receiving a request for access to at least one of a file or a directory stored in a user data region of a file system included in the electronic device; in response to receiving the request, storing, in a memory of the electronic device, first information associated with the at least one of the file or the directory stored in the user data region, and displaying a size of the at least one of the file or the directory using the first information stored in the memory. When the first information is information associated with the file, the first information comprises information indicating the size of the file, and, when the first information is information associated with the directory, the first information comprises information indicating a sum of sizes of all subdirectories included in the directory and sizes of all files included in the directory.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1:
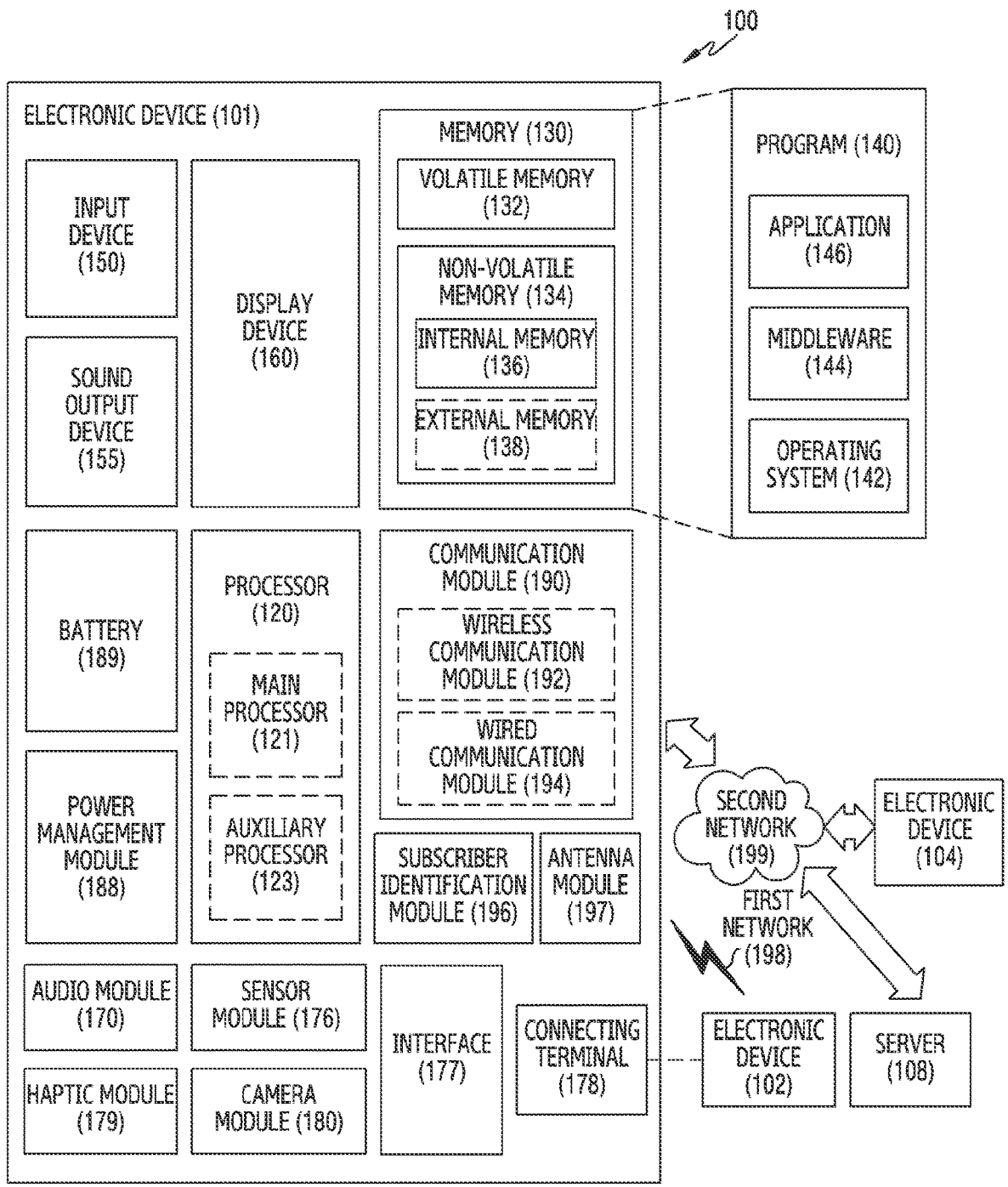
FIG. 1 illustrates an electronic device in a network environment according to an embodiment.

Hereinafter, various embodiments will be described in detail with reference to the accompanying drawings. However, for description convenience's sake, the size of constituent elements may be exaggerated or reduced in the drawings. For example, since the size and thickness of each construction shown in the drawings are arbitrarily illustrated for description convenience's sake, the present disclosure is not necessarily limited to as illustrated.

FIG. 1 illustrates an electronic device in a network environment according to an embodiment.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by one or more other components (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing records, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or IR data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements.

It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order).

It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
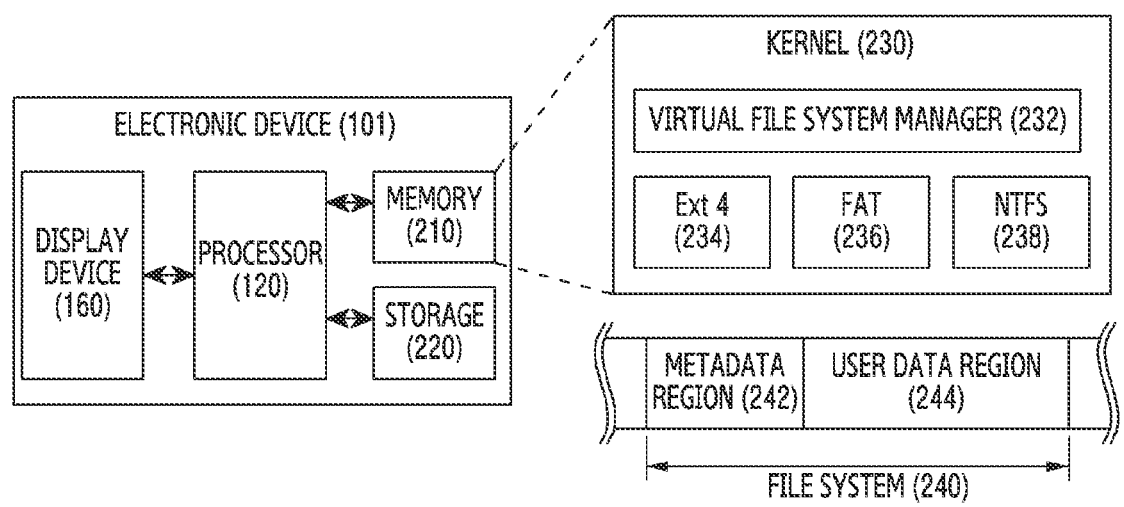
FIG. 2 illustrates an electronic device according to an embodiment.

FIG. 2 illustrates an electronic device according to an embodiment.

Referring to FIG. 2, the electronic device 101 may correspond to at least one of a smart phone, a smart pad, a tablet personal computer (PC), a PDA, a laptop PC, or a desktop PC. The electronic device 101 may correspond to a wearable device including at least one of an accessory type (e.g., a watch, a ring, a bracelet, an anklet, a necklace, glasses, contact lenses, or a head-mounted-device (HMD)), a textile or clothing integral type (e.g., electronic clothes), a body attachable type (e.g., a skin pad or a tattoo), or a bio implantable type (e.g., an implantable circuit). The electronic device 101 may be household appliances such as a refrigerator, a television (TV), a vacuum cleaner, an air-conditioner, a washing machine, and a lighting device.

The electronic device 101 may include a processor 120, a display device 160, a memory 210, and a storage 220. The processor 120, the display device 160, the memory 210, and the storage 220 may be electrically and/or operatively connected via, for example, a communication bus. For description convenience's sake, the illustration of some of the hardware components included in the electronic device 101 may be omitted.

The processor 120 may execute one or more instructions stored in the memory 210 and/or the storage 220. The processor 120 may include at least one of circuits for processing data, for example, an integrated circuit (IC), an arithmetic logic unit (ALU), a field programmable gate array (FPGA), and a large scale integration (LSI).

The memory 210 may at least temporarily store data related to the electronic device 101. The memory 210 may correspond to a volatile memory such as a random access memory (RAM) including a static RAM (SRAM) or a dynamic RAM (DRAM), etc.

According to various embodiments, the storage 220 may correspond to a storage region in which data related to the electronic device 101 is preserved. That the data is preserved may mean that the data is preserved in a state in which the electronic device 101 and/or the storage 220 are inactivated, for example, such as power-off. For example, the storage 220 may include not only a read only memory (ROM), a magnetoresistive RAM (MRAM), a spin-transfer torque MRAM (STT-MRAM), a phase-change RAM (PRAM), a resistive RAM (RRAM), a ferroelectric RAM (FeRAM), but also a non-volatile memory such as a flash memory, an embedded multi media card (eMMC), a solid state drive (SSD), etc. The non-volatile memory may be in the form of an internal memory included in the electronic device 101 and/or in the form of an external memory detachable to the electronic device 101. Hereinafter, the memory 210 may refer to at least a portion of the volatile memory and/or non-volatile memory distinct from the storage 220.

The memory 210 and/or the storage 220 may store an instruction related to an application and an instruction related to the OS. The OS may be system software executed by the processor 120. By executing the OS, the processor 120 may manage the hardware components included in the electronic device 101. The OS may present an application programming interface (API) as an application that is software other than the system software.

One or more applications that are a set of a plurality of instructions may be installed in the storage 220. An application that is installed in the storage 220 may include a plurality of applications stored in the format of being executable by the processor 120 connected to the memory 210, after the plurality of applications are moved and/or copied from the storage 220 to the memory 210.

The display device 160 may visually output information to a user using at least one of a light emitting diode (LED), an organic LED (OLED), or a liquid crystal display (LCD). In order to more intuitively control a user interface (UI) outputted through the display device 160, the electronic device 101 may include a touch screen panel (TSP) disposed on the display device 160. The touch sensor panels may detect a position of an object (e.g., a user's finger and/or a stylus) that touches the display device 160 or hovers over the display devices 160, using at least one of a resistive film, a capacitive component, a surface acoustic wave, and an IR ray.

The kernel 230 may include an OS for controlling one or more resources of the electronic device 101, middleware, or an application executable in the OS, as part of the program 140 of FIG. 1. The OS, for example, may include Android™, iOS™, Windows™, Symbian™, Tizen™, or Bada™. At least one of programs included in the kernel 230 may be preloaded to the electronic device 101 at the time of manufacture, or may be downloaded or updated from an external electronic device (e.g., an external electronic device and/or a server) at the time of being used by a user. The electronic device 101 and/or the processor 120 of various embodiments may execute the kernel 230 stored in the memory 210, and present various functions related to the electronic device 101 to the user of the electronic device 101 and/or the application.

The kernel 230 may present various functions to an application wherein the application may use a function or information presented from one or more resources of the electronic device 101 such as the storage 220. The kernel 230 may be included in an OS installed in the electronic device 101. The kernel 230 may include one or more file system managers for managing data stored in the storage 220. The storage 220 may store the data, based on a file system. The file system may refer to a format and/or scheme for storing the data in the storage 220, and also a program for supporting the format and/or scheme. The program of the file system may be included as a part of the kernel 230.

To support file systems of plural types, the kernel 230 may include middleware corresponding to each of the plural types. The kernel 230 may include at least one of a file system manager 234 for supporting a file system of an extended file system 4 (Ext4) type, a file system manager 236 for supporting a file system of a file allocation table (FAT) type, and a file system manager 238 for supporting a file system of a new technology file system (NTFS) type. When the storage 220 stores data, based on the Ext4 type, the electronic device 101 may store the data in the storage 220 using the file system manager 234 corresponding to the Ext4 type in the kernel 230.

The number of storages 220 connected to the electronic device 101 may be plural, and each of a plurality of storages may support a mutually different file system. For example, an SD card being based on the FAT type file system may be attached to a slot of the electronic device 101 including the storage 220 being based on the Ext4 type. In this case, the electronic device 101 may store data in the SD card using the file system manager 236 corresponding to the FAT type, and may store data in the storage 220 using the file system manager 234 corresponding to the Ext4 type.

The file system 240 may be formed in the storage 220. The file system 240 may include a user data region (a data blocks region) 244 for storing data such as files and a metadata region 242 for storing metadata related to the data and/or file system 240. The metadata stored in the metadata region 242 may correspond to data such as a file stored in the user data region 244, and may include information for describing the data. Alternatively, the metadata region 242 may include at least one of a boot block, a super block, and an inode block. The user data region 244 may include at least one of a data block and a user block. The storage 220 may be divided into a plurality of partitions, and each of the plurality of partitions may be specified as a mutually independent file system 240.

The kernel 230 may include a virtual file system (VFS) manager 232. For example, the VFS manager 232 may transmit files between the partitions of the plurality of partitions based on the mutually different file system 240 and/or abstract the file system 240. As the VFS manager 232 abstracts the file system 240, an application and/or a user may access the storage 220 and/or the partition without considering the characteristic of the file system 240 of the storage 220 and/or partition.

A plurality of files may be stored in the storage 220. For example, the plurality of files may be stored in the user data region 244 of the file system 240 of the storage 220. The plurality of files may be stored in the user data region 244, based on a directory. The directory may include other directories and/or one or more files. A sub directory (or a lower directory) or child directory of a specific directory may mean one or more directories included in the specific directory. A super directory (or an upper directory) or parent directory of a specific directory may mean a directory including the specific directory. When the plurality of directories exist in the storage 220, a relationship between the plurality of directories may be a relationship that is based on a hierarchy such as a tree structure.

The electronic device 101 may store data structure information corresponding to a tree structure of a directory in the storage 220. The data structure information may be stored in a file format in the user data region 244 of the file system 240 stored in the storage 220. Also, overall management such as copying, caching, or updating, etc. of the data structure information may be performed by the VFS 232.

As a user of the electronic device 101 accesses a directory and/or file of the storage 220, the electronic device 101 may store (e.g., cache) at least part of the data structure information in the memory 210.

The data structure information may include one or more nodes which are interconnected with each other based on a tree structure. The node may correspond to a directory or file stored in the storage 220. The node corresponding to the file may include information indicating the size of the corresponding file. The node corresponding to the directory may include information indicating the sizes of all subdirectories included in the corresponding directory and/or all files.

To identify the size of a specific directory of the storage 220, the electronic device 101 may, while not accessing all subdirectories and/or files stored in the specific directory, identify the size of the specific directory from information included in a node corresponding to the specific directory. Accordingly, a speed and/or time at which the electronic device 101 identifies the size of the specific directory may be independent of the number of subdirectories included in the specific directory and/or files.

In response to identification of a change of a directory and/or a file by a user and/or application of the electronic device 101, the electronic device 101 may update (or change) the data structure information, based on the change.

Figure 3:
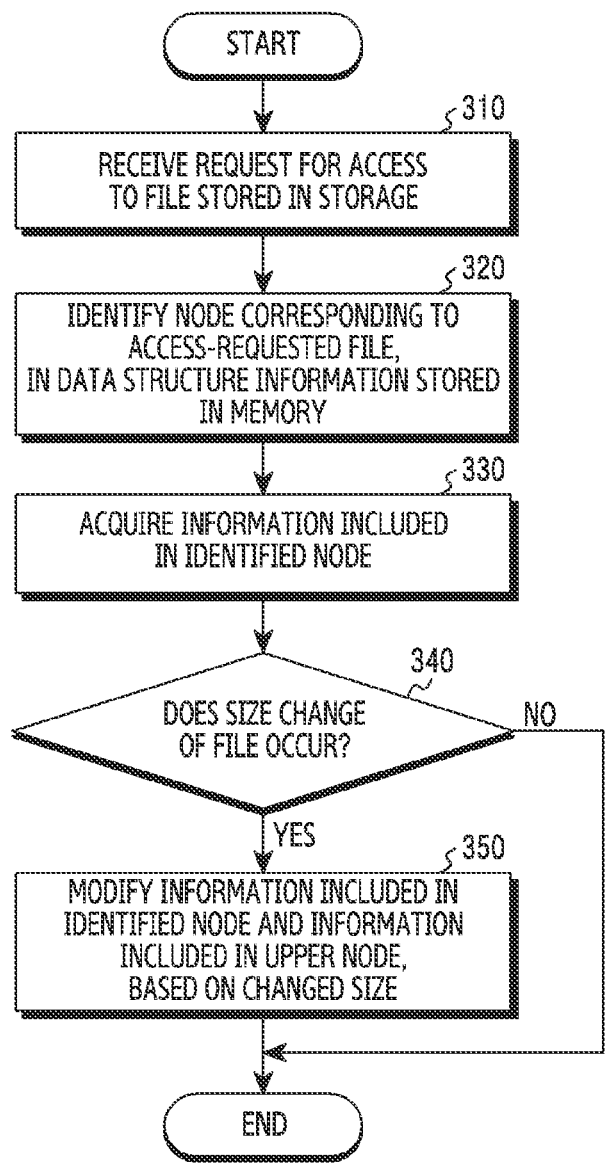
FIG. 3 is a flowchart illustrating a method performed by an electronic device according to an embodiment.

FIG. 3 is a flowchart illustrating a method performed by an electronic device according to an embodiment.

Referring to FIG. 3, in step 310, a processor (e.g., the processor 120 or the VFS manager 232 operated by the processor 120) receives a request for access to a file stored in a storage. The processor may receive the request for access to the file stored in a user data region of the storage. The processor may receive a first user input for accessing the file. Even a request for access to a directory stored in the storage may be processed in the same manner as the request for access to the file. The first user input may include a user input for accessing a directory and/or a file, based on an application such as a file manager. Accessing the directory and/or file may include opening the directory and/or file and/or displaying a list of subdirectories included in the directory and/or files.

In step 320, the processor identifies a node corresponding to the access-requested file (or directory) from data structure information stored in a memory. In order for the processor to identify the node from the data structure information stored in the memory, the processor may copy and/or cache the data structure information stored in the user data region of the storage, to the memory.

By using the data structure information stored in the user data region, the processor may construct, in the memory, data structure information corresponding to a structure (e.g., a tree structure) of a plurality of files or directories stored in the user data region.

In response to receiving the access request of step 310, the electronic device stores, in the memory, the data structure information stored in the user data region. The data structure information is information different from information included in metadata, and may include information indicating a sum of the sizes of files (or directories) and the sizes of subdirectories included in a directory and/or files. For example, when an object requested for access in step 310 is a directory, the data structure information may include information indicating the size of the access-requested directory, i.e., a sum of the sizes of all subdirectories included in the directory and all files.

In step 330, the processor acquires information included in the identified node. For example, when the processor identifies the node corresponding to the access-requested file (or directory) from the data structure information stored in the memory, the processor acquires information included in the identified node. The information included in the identified node may include the size of the access-requested file or the size of an access-requested directory. The size of the directory may indicate a sum of the sizes of all subdirectories included in the directory and all files.

In step 340, the processor determines whether a size change of the access-requested file (or directory) has occurred. For example, after receiving a request for access to a file (or directory) (receiving the first user input), the processor receives a second user input for changing the size of the file (or directory). When an object requested for access is a file, the size of the file may be changed when the file is changed and/or deleted by the second user input. When the object requested for access is a directory, the size of the directory may be changed when the directory is moved and/or deleted by the second user input or files are added, deleted, and/or changed in the directory.

When the size of the access-requested file (or directory) is changed in step 340, the processor modifies (or changes) information included in the identified node (a node corresponding to the file or directory whose size has changed) and information included in an upper node of the node, based on the changed size in step 350. When the object whose size has changed is a file, the upper node may include a node corresponding to a directory in which the file is stored and a node corresponding to an upper directory of the directory. When the object whose size has changed is a directory, the upper node may include a node corresponding to an upper directory of the directory.

Figure 4A:
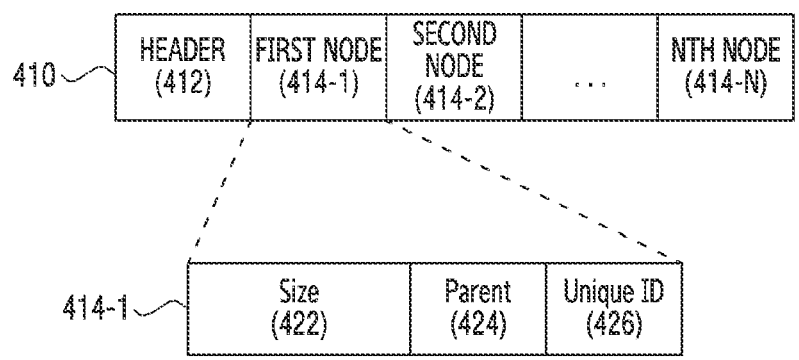
FIG. 4A and FIG. 4B illustrate information managed by an electronic device according to an embodiment.
Figure 4B:
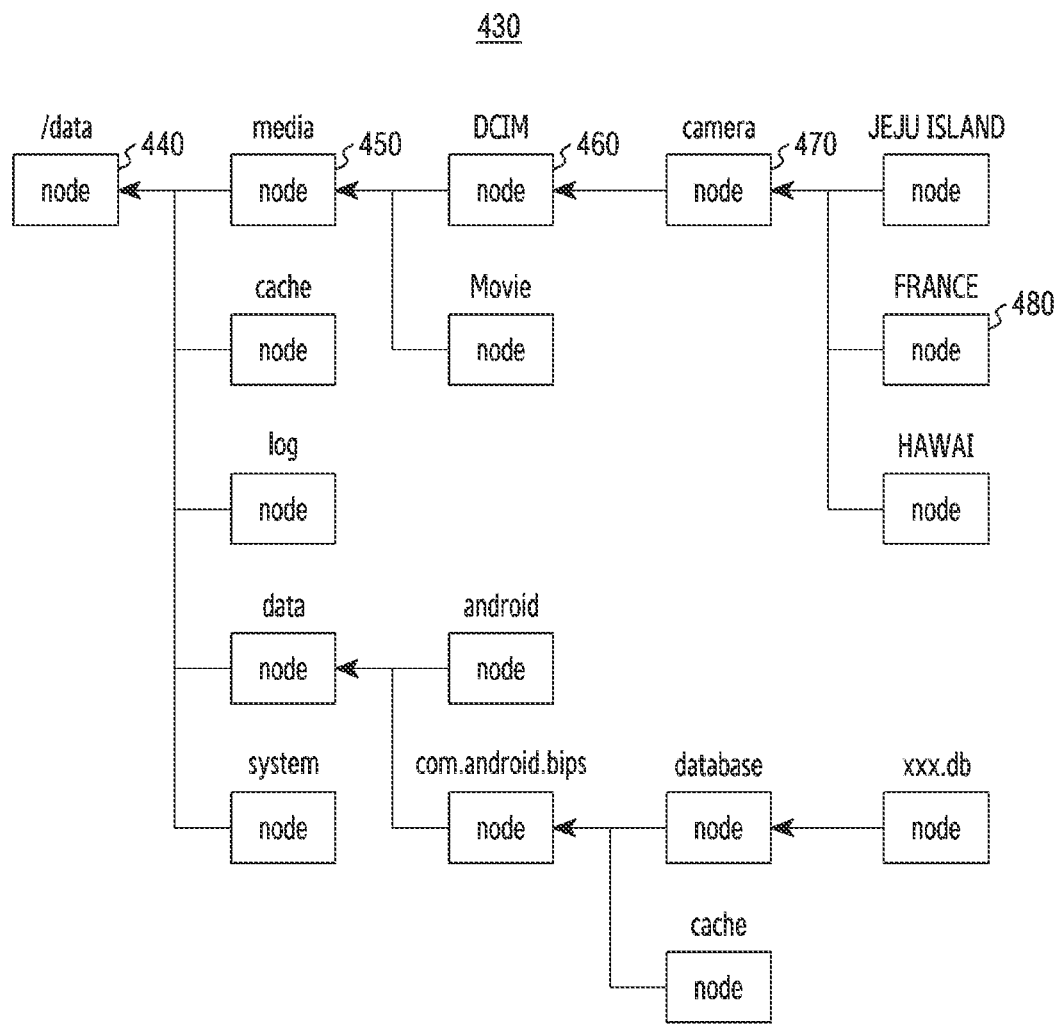

FIG. 4A and FIG. 4B illustrate information managed by an electronic device according to an embodiment.

Referring to FIG. 4A, the electronic device may store data structure information 410 in a storage. For example, the data structure information 410 may be stored in the user data region 244 for storing data (a file and/or a directory) within the file system 240 of the storage 220 of FIG. 2. Since the electronic device stores the data structure information 410 in the user data region 244 distinct from the metadata region 242 for storing metadata, the electronic device may generate the data structure information 410 without formatting a partition in which the file system 240 has been stored.

The data structure information 410 may include a header 412 including metadata for describing the data structure information 410. The data structure information 410 may include a plurality of nodes having a one-to-one corresponding relationship with all objects (e.g., directories and/or files) stored in the user data region 244. When N objects (files and/or directories) are stored in the user data region 244, N nodes (a first node 414-1 to an Nth node 414-N) may be stored in the data structure information 410.

Although FIG. 4A only illustrates the information included in the first node 414-1, information included in other nodes (e.g., the second node 414-2 to the Nth node 414-N) stored in the data structure information 410 may also be similar to the information included in the first node 414-1. The size of each of the plurality of nodes including the first node 414-1 may be 16 bytes. The information included in the first node 414-1 may be divided into a size field 422, a parent field 424, and a unique ID field 426. Each of the size field 422, the parent field 424, and the unique ID field 426 may store different types of information (data).

A size associated with an object (a file or a directory) corresponding to the first node 414-1 may be stored in the size field 422 of the first node 414-1. When the object corresponding to the first node 414-1 is a file, the size of the file may be stored in the size field 422. When the object corresponding to the first node 414-1 is a directory, a sum of the sizes of all objects included in the directory (e.g., subdirectories, and/or files stored in the directory) may be stored in the size field 422. The size field 422 may have the size of, for example, 8 bytes, and may indicate the size of an object, based on a specified size unit (e.g., byte, Kilo-byte, and/or Mega-byte).

An identifier of an upper node of the first node 414-1 may be stored in the parent field 424. For example, when the object corresponding to the first node 414-1 is a file, an identifier of a directory in which the file is stored may be stored in the parent field 424. When the object corresponding to the first node 414-1 is a directory, an identifier of an upper directory of the directory may be stored in the parent field 424. The parent field 424 may have the size of, e.g., 4 bytes.

An identifier of an object (a file or a directory) corresponding to the first node 414-1 may be stored in the unique ID field 426. An identifier uniquely allocated to the directory and/or file corresponding to the first node 414-1 may be stored in the unique ID field 426. The unique ID field 426 may have the size of, for example, 4 bytes.

The identifier stored in the parent field 424 and/or the unique ID field 426 may include an identifier and/or index that is configured to be uniquely allocated to an object in a file system of a partition and/or storage in which the data structure information 410 and/or the object (the file and/or the directory) are stored. The identifier may correspond to an inode number corresponding to an object in a file system of an Ext4 type.

An identifier of another object (e.g., a directory) distinct from the object (the file or the directory) corresponding to the first node 414-1 may be stored in the parent field 424. When the object corresponding to the first node 414-1 is a file, an identifier of a directory in which the file is stored may be stored in the parent field 424. When the object corresponding to the first node 414-1 is a directory, an identifier of an upper directory of the directory may be stored in the parent field 424. Since other objects stored in the storage correspond to other nodes included in the data structure information 410, the first node 414-1 may represent a relationship with other nodes distinct from the first node 414-1, based on the parent field 424. The relationship may correspond to a relationship (e.g., a tree structure that is based on the directory) between the objects (the files and/or the directories) stored in the storage.

Referring to FIG. 4B, the electronic device may store data structure information 430 in a memory. The electronic device may copy and/or cache the data structure information 410 stored in a storage, to the memory. The storage may include (or store) the data structure information 410 as at least one or more files, and the electronic device may read and copy/cache the data structure information 410 stored as the at least one file in the storage, to the memory through the file system manager.

The data structure information 430 stored in the memory may be configured in a tree structure, based on a relationship between nodes. The tree structure of the nodes included in the data structure information 430 may correspond to a tree structure of objects (files and/or directories) stored in the user data region 244 of the file system 240. A plurality of nodes stored in the data structure information 430 may have a node 440 corresponding to the uppermost directory of the file system 240, as the uppermost node, and may have a tree structure corresponding to the tree structure of the files and/or directories stored in the file system 240.

The uppermost node 440 may be copied and/or cached from the storage to the memory when the file system 240 is mounted. For example, as the node (e.g., the first node 414-1) corresponding to the uppermost node included in the data structure information 410 stored in the storage is copied and/or cached to the memory, it may be the uppermost node 440 of the data structure information 430 stored in the memory. Mounting the file system 240 may include the electronic device making and/or converting a state of the directory and/or file stored in the file system 240 into a state accessible by a user and/or application. The mounting of the file system 240 may be performed when the electronic device boots and/or when the electronic device and the storage are connected to each other, e.g., based on Plug-and-Play (PnP). While the file system 240 is mounted, the electronic device may perform the consistency check of a plurality of nodes each corresponding to a plurality of objects (files and/or directories) stored in the file system 240.

After the file system 240 is mounted, as a user and/or an application of the electronic device accesses an object (a file or a directory) stored in the storage, at least one of a plurality of nodes included in the data structure information 410 of the storage may be copied and/or cached to the memory. The node included in the data structure information 430 may correspond to a node acquired and/or cached from the storage. For example, when the user of the electronic device accesses a specific object (e.g., a "media" directory of FIG. 4B) stored in the file system 240, based on an application such as a file manager, the electronic device of an embodiment may copy and/or cache a node 450 corresponding to the specific object from the storage to the memory. In this case, the uppermost node 440 included in the data structure information 430 and the node 450 corresponding to the specific object may be stored in the memory.

When the user of the electronic device accesses a "media" directory and then accesses a file and/or a subdirectory (e.g., a "DCIM" directory of FIG. 4B) of the "media" directory, the electronic device may store a node corresponding to the newly accessed object (e.g., a node 460 corresponding to the "DCIM" directory) from the storage to the memory. The nodes 440, 450, and 460 may be stored in the memory, and the nodes 440, 450, and 460 stored in the memory may be connected in a uni-direction.

When the user of the electronic device searches for objects (files and/or directories) of the file system 240 according to a tree structure of a directory, the electronic device may store a node corresponding to the searched object and another node directed by the node, as the data structure information 430, in the memory. Here, the another node may be a node directed by a parent field (e.g., the parent field 424 of FIG. 4A) within the node. While the user of the electronic device accesses a "France" directory, a node 480 corresponding to the "France" directory and the nodes 440, 450, 460, and 470 each corresponding to all upper directories of the node 480 may be stored as the data structure information 430 in the memory of the electronic device. Within the memory, the nodes 440, 450, 460, 470, and 480 may be connected in uni-direction by a field (e.g., the parent field 424 of FIG. 4A) directing an upper node within the node.

The electronic device may store one or more nodes (e.g., the nodes 440, 450, 460, 470, and 480) related to an object (e.g., the "France" directory) within a file system accessed by the user and/or the application, as the data structure information 430, in the memory. After accessing the object (the file or directory), when the user of the electronic device performs an operation related to the object (e.g., changing and/or deleting the object), the electronic device may change information stored in the one or more nodes (e.g., information stored in the size field 422 of FIG. 4A), in the data structure information 430 stored in the memory.

Nodes included in the data structure information 430 stored in the memory may correspond to nodes included in the data structure information 410 stored in the storage. For example, the nodes included in the data structure information 430 stored in the memory may also include a size field (e.g., the size field 422 of FIG. 4A). The electronic device may quickly identify the size of a directory and/or file corresponding to the node, based on the size field of the node included in the data structure information 430 stored in the memory.

When the electronic device receives a request for access to the "media" directory, even if the electronic device does not sum up and figure out the sizes of all subdirectories included in the "media" directory and/or files, the electronic device may identify and/or display the size of the "media" directory by accessing the size field of the node 450 corresponding to the "media" directory included in the data structure information 430 stored in the memory. Instead of accessing all the subdirectories included in the "media" directory and/or the files and summing up the sizes thereof, the electronic device accesses the size field of the corresponding node 450 and acquires information summing up the sizes of all the subdirectories and/or files, so the electronic device may quickly identify the size of the "media" directory, even though the number of the subdirectories and/or files in the "media" directory is increased.

In response to a user input for indicating the size of a specific directory (e.g., the "media" directory), the electronic device does not access all the subdirectories included in the "media" directory and/or the files, so the electronic device can prevent overloading that may occur as the subdirectories and/or files are accessed. The overloading may result in an error (e.g., application crash and/or platform reset) of the application and/or the OS. As the electronic device prevents the overloading, the application and/or OS errors can also be prevented.

Figure 5:
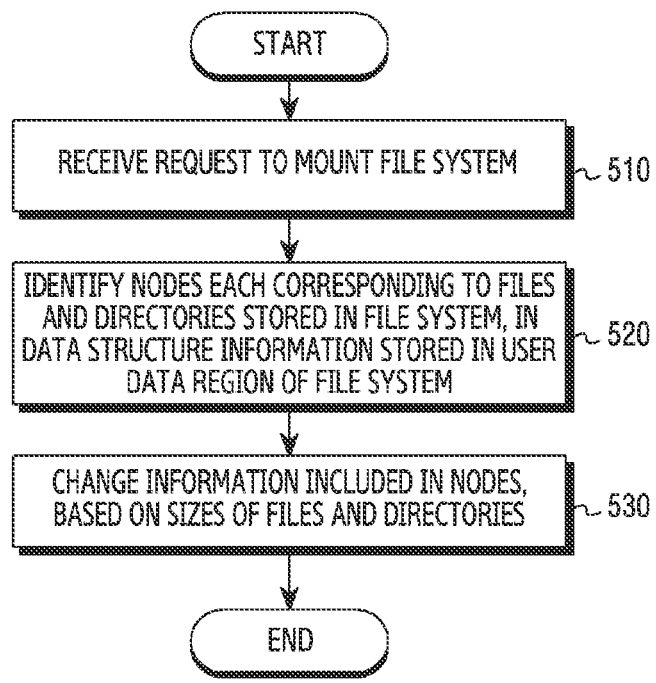
FIG. 5 is a flowchart illustrating a method performed by an electronic device according to an embodiment.

FIG. 5 is a flowchart illustrating a method performed by an electronic device according to an embodiment.

Referring to FIG. 5, in step 510, a processor (e.g., the processor 120) receives a request to mount a file system (e.g., the file system 240). The request to mount the file system may be provided by a process (e.g., an initialization process) which is running in the electronic device. The request to mount the file system may include a request to check the consistency of a plurality of nodes (e.g., the first node 414-1 to the Nth node 414-N of FIG. 4A) each corresponding to all objects (files and/or directories) stored in the file system. The consistency may refer to information (e.g., information stored in the size field 422 of FIG. 4A) of each of the plurality of nodes matching information acquired based on a corresponding object (file or directory).

In step 520, the processor identifies nodes (the first node 414-1 to the Nth node 414-N of FIG. 4A) corresponding to all objects (files and directories) stored in the file system, in data structure information (e.g., the data structure information 410) stored in a user data region (e.g., the user data region 244) of the file system. The processor may perform step 520, in response to the request in step 510. The node may be connected to another node, based on a tree structure of a plurality of objects (files and/or directories) stored in the file system.

In step 530, the processor changes information included in the nodes, based on the sizes of the objects (the files and/or directories). The processor may sequentially search for all of the plurality of nodes identified in step 520, based on an algorithm for searching the tree structure. When the node corresponds to a file, the processor may determine whether information (e.g., information of the size field) stored in the node corresponds to the size of the file. When the information does not correspond to the size of the file, the processor may change the information, based on the size of the file. In response to the change of the information, the processor may change information included in at least one another node (e.g., a node corresponding to a directory in which the file is stored and an upper directory of the directory) directed by the node.

The processor may generate all nodes each corresponding to all objects (files and/or directories) stored in the file system, as data structure information (e.g., the data structure information (430)), in the memory, based on a tree structure of the objects. Information (e.g., a size field) included in each of a plurality of nodes included in the data structure information generated in the memory may be initialized to 0 (zero). Thereafter, the processor may sequentially search for the plurality of nodes included in the data structure information in the memory that is based on the tree structure, and change the information of each of the plurality of nodes. The processor may change the information included in the node, based on the size of an object (a file or a directory) corresponding to the node. In response to the change of the information, the processor may change the information included in another node (e.g., an upper node of the node) directed by the node. Searching for the plurality of nodes in the processor may be carried out from the lowermost node (e.g., the node 480 of FIG. 4B) of the tree structure to the uppermost node (e.g., the node 440 of FIG. 4B).

After checking the consistency of all nodes based on step 530, the processor may perform the mounting of the file system based on the request in step 510. After performing step 530 of FIG. 5, the processor may copy and/or cache the uppermost node (e.g., the node 440 of FIG. 4B) among the plurality of nodes in the memory. After step 530 of FIG. 5 is performed, the first user input to the second user input of FIG. 3 may be received from the user of the electronic device.

Figure 6:
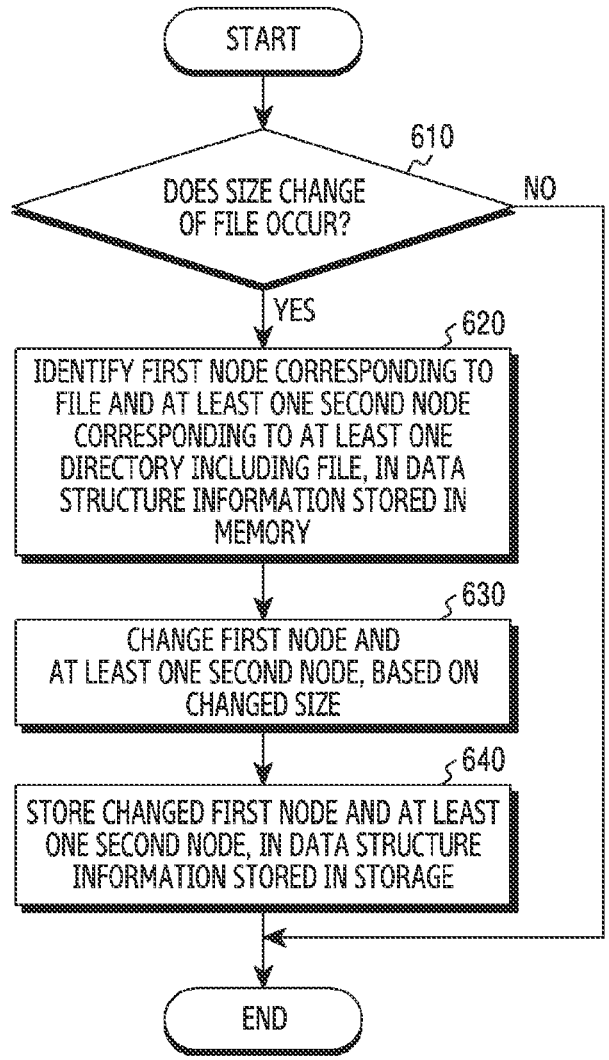
FIG. 6 is a flowchart illustrating a method performed by an electronic device according to an embodiment.

FIG. 6 is a flowchart 600 illustrating a method for an operation performed by an electronic device according to an embodiment.

Referring to FIG. 6, in step 610, a processor (e.g., the processor 120) determines whether a file size change has occurred. For example, after a user of the electronic device accesses a file, the user may change the file, based on an application (e.g., a word processor application) corresponding to the file.

Changing the size of the file may include deleting the file. After the user of the electronic device accesses the file, the user may request to delete the file, based on an application such as a file manager.

When the file size change does not occur (e.g., output of "No" in step 610), the processor may not perform steps 620, 630, and 640, as described herein. For example, when the user of the electronic device does not store the changed file while terminating the application, the processor may not perform steps 620, 630, and 640.

When the size of the file is changed (e.g., output of "Yes" in step 610), in step 620, the processor identifies a first node corresponding to the file and at least one second node corresponding to at least one directory including the file, in data structure information (e.g., the data structure information 430) stored in a memory. The at least one second node may correspond to another node directed by the first node. The at least one second node may include another node corresponding to an identifier of a parent field (e.g., the parent field 424 of FIG. 4A) of the first node and a further another node serially connected by a parent field of the another node. The at least one second node may include a node (e.g., an upper node) corresponding to an upper object (e.g., a directory in which a file is stored and/or an upper directory of the directory) of an object (the file) corresponding to the first node.

Before the user of the electronic device changes the size of the file, based on step 610, the first node and the at least one second node may be stored as the data structure information in the memory. For example, the first node and the at least one second node may be stored in the memory at a time point when the user of the electronic device accesses the file or before the time point. The first node and the at least one second node may be stored and/or cached as the data structure information in the memory, based on step 320 of FIG. 3. The at least one second node may be a node (e.g., an upper node) directed by information (e.g., the parent field 424 of FIG. 4A) included in the first node. The first node and the at least one second node may include a field (e.g., the size field 422 of FIG. 4A) for storing a size related to a corresponding object (file and/or directory).

In step 630, the processor changes information of the first node and the at least one second node, based on the changed size. The information may be information stored in size fields of the first node and the at least one second node. The processor may change the information stored in the size field of the first node into information corresponding to the changed size of the file. The processor may change information stored in the size field of the at least one second node, based on the changed size of the file. The processor may increase a data value corresponding to the information (e.g., the information stored in the size field) of the first node and the at least one second node by an increment (A size) of the size of the file.

In step 640, the processor stores the changed first node and at least one second node, in data structure information (e.g., the data structure information 410) stored in the storage. The processor may perform step 640 when storing, in the storage, the file changed based on step 610. After step 640, the information of the first node and the at least one second node may match with each other in the entire memory and storage.

Figure 7:
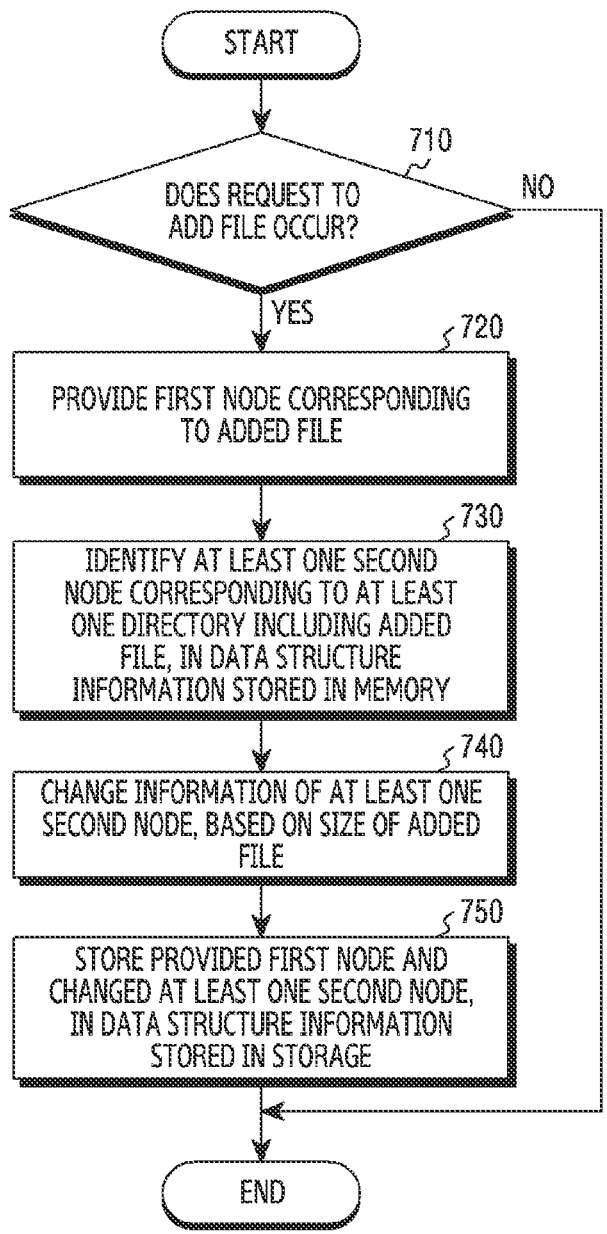
FIG. 7 is a flowchart illustrating a method performed by an electronic device according to an embodiment.

FIG. 7 is a flowchart illustrating a method performed by an electronic device according to an embodiment.

Referring to FIG. 7, in step 710, a processor (e.g., the processor 120) determines whether a request to add a file has occurred. A user of the electronic device may select a menu (e.g., a save button of a graphic application) for storing, in the form of a file, data (e.g., image data) which is generated based on an application (e.g., a graphic application). In response to the selection of the menu, the processor may determine that the user has added the file. For another example, the user of the electronic device may select another menu for copying or moving one or more files. In response to the selection of the another menu, the processor may determine that the user adds one or more files to a specified position.

When the request to add the file does not occur (e.g., output of "No" in step 710), the processor does not perform steps 720, 730, 740, and 750, as described herein.

When the request to add the file occurs (e.g., output of "Yes" in step 710), in step 720, the processor generates a first node corresponding to the added file. Information included in the first node may be the same as or similar to the information included in the node illustrated in FIG. 4A. A size field of the first node may include information indicating the size of the added file. A parent field of the first node may include information indicating an identifier of a directory to which the file is added. A unique ID field of the first node may include information indicating an identifier uniquely allocated to the added file. Since a new file not stored in a file system (e.g., the file system 240) is added, the first node may be a new node distinct from all nodes (e.g., the first node 414-1 to Nth node 414-N of FIG. 4A) corresponding to all objects (files and/or directories) stored in the file system.

Referring to FIG. 7, in step 730, the processor identifies at least one second node corresponding to at least one directory including the added file, in data structure information (e.g., the data structure information 430) stored in a memory. The at least one second node may correspond to another node directed by the first node. The at least one second node may include another node corresponding to an identifier of a parent field of the first node and a further another node serially connected by a parent field of the another node. The at least one second node may include at least one node corresponding to each of a directory in which the file added based on step 710 will be included and an upper directory of the directory.

In step 740, the processor changes information of the at least one second node, based on the size of the added file. The information may be information stored in the size field of the at least one second node. The processor may change information stored in the size field of the at least one second node, based on the size of the added file. The processor may increase, by the size of the added file, a data value corresponding to the information stored in the size field of the at least one second node.

In step 750, the processor stores the generated first node and the changed at least one second node, in data structure information (e.g., the data structure information 410) stored in a storage. The processor may perform step 750 similar to step 640. After the processor performs step 750, the generated first node and the changed at least one second node may be identically stored in all of the memory and the storage.

Figure 8:
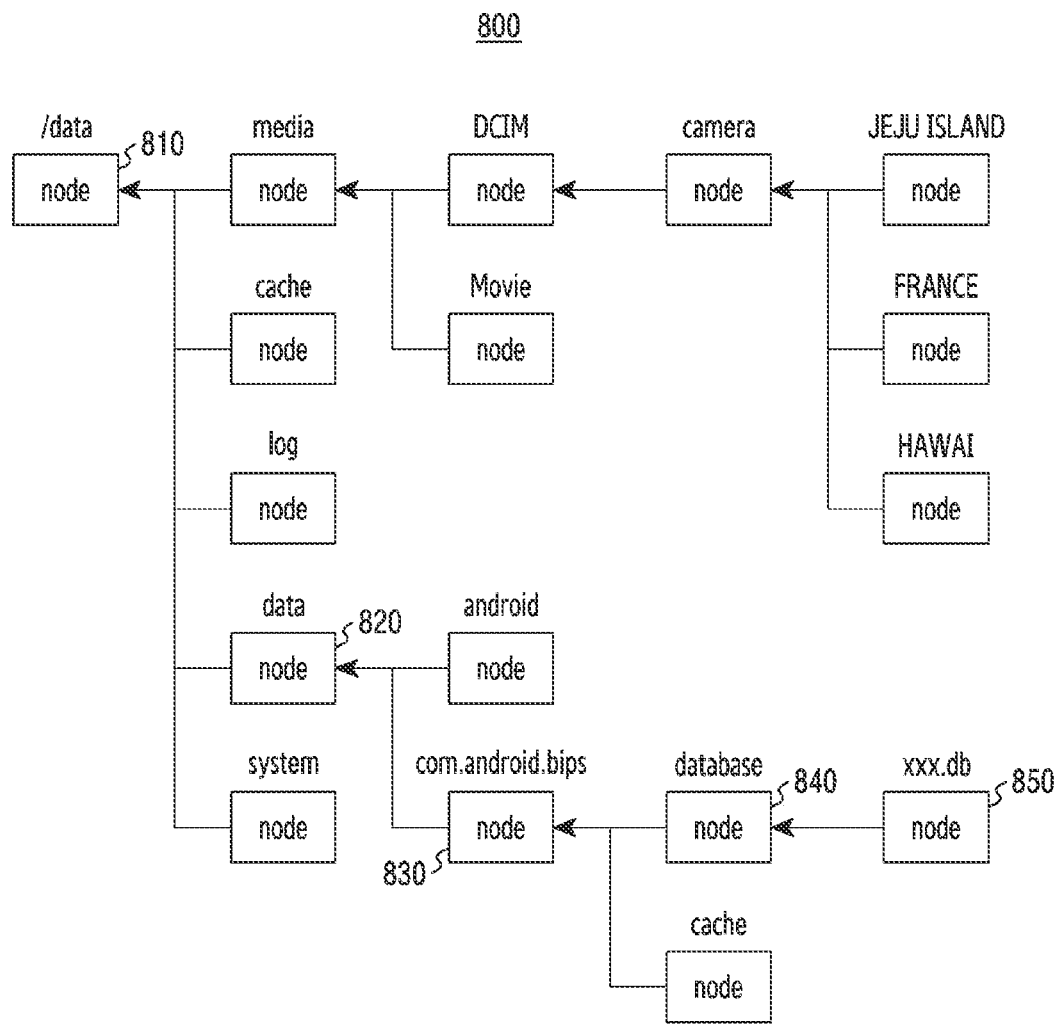
FIG. 8 illustrates an operation performed by an electronic device in response to a change of an object according to an embodiment.

FIG. 8 illustrates an operation performed by an electronic device in response to a change of an object according to an embodiment.

Referring to FIG. 8, a tree structure 800 includes nodes, each corresponding to objects (directories and/or files) stored in a file system (e.g., the file system 240 of FIG. 2) of a storage (e.g., the storage 220 of FIG. 2). Since a relationship between the objects (the directories and/or files) stored in the storage is based on the tree structure 800, a relationship between nodes each corresponding to the objects may also be based on the tree structure 800. The nodes may be included in data structure information (e.g., the data structure information 410 of FIG. 4A) stored in a user data region (e.g., the user data region 244 of FIG. 2) of the file system in which the objects are stored. The nodes may store information associated with a corresponding object (file or directory), based on the information included in the node illustrated in FIG. 4A.

As at least one of the objects (the files and/or directories) stored in the file system is accessed, a processor (e.g., the processor 120) may store and/or cache a node corresponding to the accessed at least one object (file and/or directory) in a memory (e.g., the memory 210 of FIG. 2). The uppermost node 810 of the tree structure 800, a node (e.g., a node 850) corresponding to an accessed object, and at least one node (e.g., nodes 820, 830, and 840) disposed between the uppermost node 810 and the node (e.g., the node 850) corresponding to the accessed object in the tree structure 800 may be stored in data structure information (e.g., the data structure information 430) within the memory. Storing the at least one node in the memory by the processor may be performed based on steps 310, 320, and 330 of FIG. 3. For example, when a user of the electronic device accesses an "xxx.db" file, the electronic device may store, in the memory, not only the node 850 corresponding to the "xxx.db" file and the uppermost node 810, but also the nodes 820, 830, and 840 disposed between the accessed node 850 and the uppermost node 810 in the tree structure 800.

When subdirectories (/data/com.android.bips/database/) are sequentially accessed within the uppermost directory (/data) of a file system, the processor of an embodiment may sequentially store, in the memory, the nodes 820, 830, and 840 corresponding to the directories, whenever the directories are sequentially accessed. Thereafter, when the "xxx.db" file is accessed, the processor may store the node 850 corresponding to the "xxx.db" file in the memory.

As another example, when a specific application (e.g., a database management application) related to the "xxx.db" is executed, the processor of an embodiment may store, in the memory, the node 850 corresponding to the "xxx.db" file and the other nodes 820, 830, 840 serially directed by the node 850. The nodes 810, 820, 830, 840, and 850 stored as the data structure information in the memory may be connected to each other, based on information (e.g., the information stored in the parent field 424 of FIG. 4A) directing another node within a node.

After accessing the "xxx.db" file, the processor may receive various types of user inputs (e.g., the second user input of FIG. 3) related to the "xxx.db" file. The "xxx.db" file may be changed, or the "xxx.db" file may be removed.

By changing and/or removing the "xxx.db" file, the size of the "xxx.db" file may be changed. The electronic device of an embodiment may detect a change of the size of the "xxx.db" file, based on step 340 of FIG. 3 and/or step 610 of FIG. 6.

In response to detecting the change of the size of the "xxx.db" file, the processor of an embodiment may change the information included in the nodes 810, 820, 830, 840, and 850 included in the data structure information stored in the memory. When the size of the "xxx.db" file increases or decreases by A size, the processor may increase or decrease, by A size, a data value corresponding to information (e.g., the information stored in the size field 422 of FIG. 4A) indicating the size related to the file, in all the nodes 810, 820, 830, 840, and 850.

When the node corresponds to a file, information indicating the size of the file may be stored in a size field of the node. In response to detecting a change of the size of the "xxx.db" file, the processor may store information indicating the size of the "xxx.db" file, in a size field of the node 850 corresponding to the "xxx.db" file. When the node corresponds to a directory, a sum of the sizes of all subdirectories included in the directory and all files may be stored in a size field of the node. A sum of the sizes of all subdirectories (a "database" directory and a "cache" directory) included in a "com.android.bips" directory and all files ("xxx.db") may be stored in a size field of the node 830 corresponding to the "com.android.bips" directory. In response to the detecting of the change of the size of the "xxx.db" file, the processor changes the information included in the nodes 810, 820, 830, and 840, thereby changing size fields of one or more nodes (the nodes 810, 820, 830, and 840) corresponding to a directory (the "database" directory) in which the "xxx.db" is stored and all upper directories (the "com.android.bips" directory, the "data" directory, and the uppermost directory (the "data" directory)) of the directory may be updated (or changed) based on the changed size of the "xxx.db" file.

When the "xxx.db" file is deleted, the processor may remove the node 850 corresponding to the "xxx.db" file, and also may change the information of the other nodes 810, 820, 830, and 840 serially directed by the node 850, based on the size of the "xxx.db" file. For example, the size of the "xxx.db" file may be subtracted from a data value corresponding to the information stored in the size field of each of the nodes 810, 820, 830, and 840. An operation in which the processor of an embodiment changes the information of the nodes 810, 820, 830, 840, and 850 may be carried out based on step 350 of FIG. 3 and/or steps 620, 630, and 640 of FIG. 6.

As another example, the "xxx.db" file may be generated within the file system. The processor of an embodiment may identify the generated "xxx.db" file, based on step 340 of FIG. 3 and/or step 710 of FIG. 7. In this case, the processor may generate the node 850 corresponding to the "xxx.db" file, based on step 720 of FIG. 7. The generated node 850 may be stored as the data structure information (e.g., the data structure information 430) in the memory.

When the node 850 is generated, the processor may identify the other nodes 810, 820, 830, and 840 serially directed by the node 850, based on step 730 of FIG. 7. The processor may change the information of the identified other nodes 810, 820, 830, and 840 (e.g., the information stored in the size field of each of the nodes 810, 820, 830, and 840), based on the size of the "xxx.db" file and/or the information of the node 850, based on step 740 of FIG. 7. For example, the data value corresponding to the information stored in the size field of each of the nodes 810, 820, 830, and 840 may be increased based on the size of the "xxx.db" file.

In response to a change of the size of a specific object (e.g., the "xxx.db" file), the processor of an embodiment updates (or changes) only the nodes 810, 820, 830, 840, and 850 stored in the memory and connected in uni-direction among all nodes connected in the tree structure 800, so the processor may quickly update (or change) the node according to the size change of the object. The nodes included in the data structure information stored in the memory may be used to acquire information indicating the size of an object (a file and/or a directory).

Figure 9:
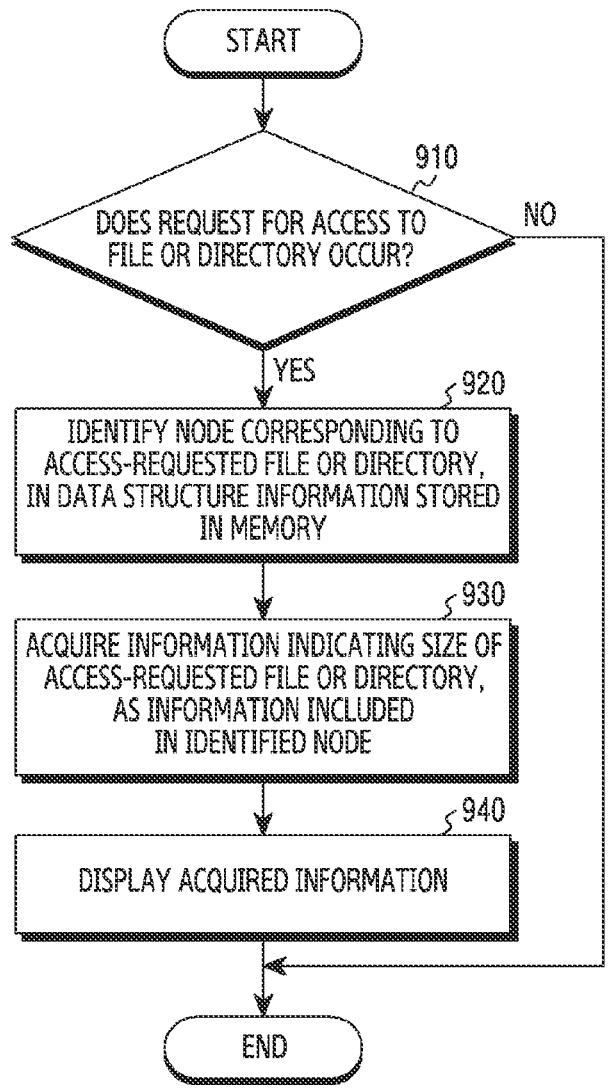
FIG. 9 is a flowchart illustrating a method performed by an electronic device according to an embodiment.

FIG. 9 is a flowchart illustrating a method performed by an electronic device according to an embodiment.

Referring to FIG. 9, in step 910, a processor of the electronic device determines whether a request for access to a file or directory has occurred. For example, a user of the electronic device may select a menu (e.g., a storage management menu of a setting application) for accessing a file or directory, based on an application such as a file manager and/or the setting application. When the request for access to the file or directory does not occur (e.g., "No" in step 910), the processor does not perform steps 920, 930, and 940, as described herein.

When the request for access to the file or directory occurs (e.g., "Yes" in step 910), in step 920, the processor identifies a node corresponding to the access-requested file or directory, in data structure information (e.g., the data structure information 430) stored in a memory. For example, when a request for access to the "com.android.bips" directory of FIG. 8 has occurred, the processor may identify the node 830 corresponding to the "com.android.bips" directory from the data structure information stored in the memory. Identifying the node 830 may include copying and/or caching the node 830 from data structure information (e.g., the data structure information 410) stored in a storage to the data structure information (e.g., the data structure information 430) stored in the memory.

In step 930, the processor acquires information indicating the size of the access-requested file or directory, as information included in the identified node. For example, the processor may acquire information of a size field (e.g., the size field 422 of FIG. 4A) included in the identified node. When the request for access to the "com.android.bips" directory has occurred, the processor may acquire information stored in the size field of the node 830. The information may indicate a sum of the sizes of all subdirectories included in the "com.android.bips" directory and all files.

In step 940, the processor displays the acquired information. The processor may display the acquired information in a UI that is based on a file manager and/or a setting application.

By using only a single node related to the selected (or access-requested) file or directory, the electronic device may identify the size of the file or identify a sum of the sizes of all subdirectories included in the directory and/or all files, based on step 920. The node may store a change of the size of the directory and/or file in real time, based on operations of FIG. 3 and FIG. 5 to FIG. 7. After receiving the request of step 910, the processor of an embodiment may quickly present (or display) the size of the file or directory to a user, even though not executing a separate process (e.g., a separate background process and/or thread) for acquiring the size of the file or directory. Even if not accessing all the subdirectories included in the directory and/or all the files, the processor of an embodiment may identify the size of the directory, based on operations of FIG. 9. Since the processor does not access all the subdirectories included in the directory and/or all the files, the processor can prevent overloading caused by the accessing.

Figure 10:
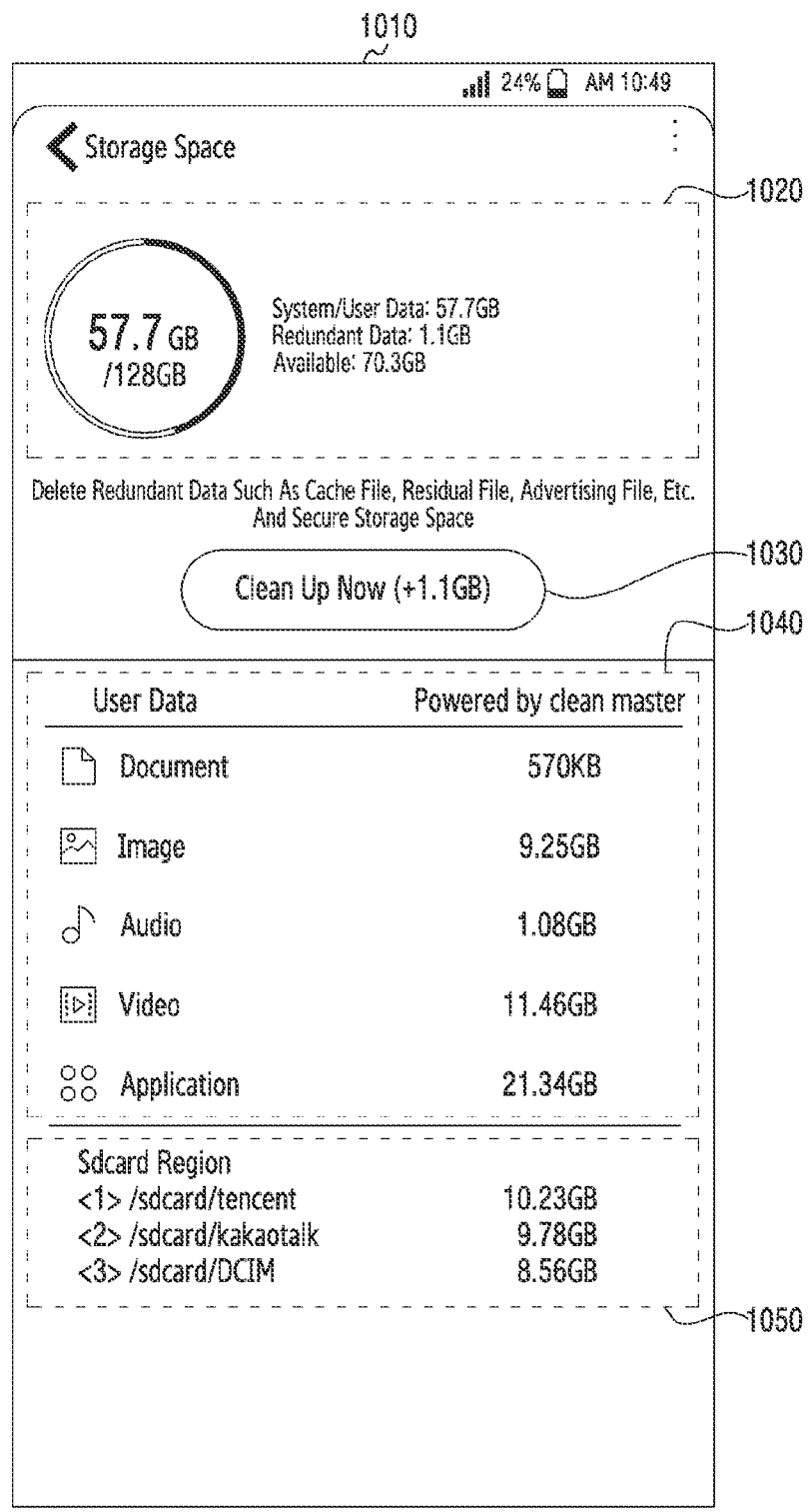
FIG. 10 illustrates an operation in which an electronic device displays the size of a storage on a display according to an embodiment.

FIG. 10 illustrates an operation in which an electronic device displays the size of a storage on a display according to an embodiment.

Referring to FIG. 10, a screen 1010 may be displayed in the display by the electronic device, e.g., based on at least one of operations of FIG. 9. The screen 1010 may include a UI for displaying information associated with the size of a directory and/or file stored in a file system of the electronic device, based on a specified application such as a file manager and/or a setting application.

The electronic device may display, within a first portion 1020 of the screen 1010, the size (e.g., 57.7 GB) of all files stored in a storage compared to the entire capacity (e.g., 128 GB) of the storage. The electronic device may identify the size of all the files stored in the storage, based on the node 810 corresponding to the uppermost node in the tree structure 800 of FIG. 8.

The electronic device may display, in the screen 1010, various information associated with the size of a directory and/or a file, using at least one of a plurality of nodes that are aligned based on the tree structure 800 of FIG. 8. For example, the electronic device may display, within the first portion 1020 of the screen 1010, the size of redundant data such as a cache file stored in the storage. The electronic device may display, in the screen 1010, a visual element 1030 having the form of a button for removing the redundant data. The electronic device may display, within a second portion 1040 of the screen 1010, a sum (e.g., 570 KB) of the size of one or more files corresponding to a specified type (e.g., a document file) among a plurality of files stored in the storage. The electronic device may display, within a third portion 1050 of the screen 1010, information associated with the size of an SD card embedded in the electronic device, by directory of the SD card.

In response to a request for access to a directory (including the uppermost directory such as a root directory) included in a file system, the electronic device of various embodiments may identify, instead of accessing all objects (e.g., subdirectories and/or files) stored in the directory and summing up the sizes of all the objects, the size of the directory using data structure information stored in a storage and/or memory. Here, the size of the directory may be a sum of the sizes of all the objects stored in the directory. The data structure information may include a plurality of nodes each corresponding to all objects (files and/or directories) of the file system. A relationship between the plurality of nodes may be based on a directory structure (e.g., a tree structure) in which an object (a file and/or directory) is stored within the file system. Each of the plurality of nodes may include information associated with the corresponding object (file and/or directory). The information may indicate, when the node corresponds to a file, the size of the file and, when the node corresponds to a directory, a sum of the sizes of all subdirectories stored in the directory and all files.

As described above, according to an embodiment, an electronic device may include a storage including a file system, a memory, and at least one processor operatively connected with the storage and the memory. The memory may store at least one instruction for, when executed, enabling the at least one processor to receive a request for access to a file or directory stored in a user data region of the file system, and in response to receiving the request, store, in the memory, first information associated with the file or directory stored in the user data region, and display the size of the file or directory using the first information stored in the memory. The first information may include, when the first information is information associated with the file, information indicating the size of the file, and include, when the first information is information associated with the directory, information indicating a sum of the sizes of all subdirectories and all files included in the directory.

The first information may further include an identifier allocated to the file or directory and an identifier allocated to an upper directory of the file or directory.

The at least one instruction may instruct the at least one processor to, in response to receiving the request, store the first information together with at least one second information associated with at least one upper directory of the file or directory, wherein the at least one second information may include information indicating a sum of the sizes of all subdirectories and all files included in the at least one upper directory, an identifier allocated to the at least one upper directory, and an identifier allocated to an upper directory of the at least one upper directory.

The first information and the at least one second information may be connected in a tree structure corresponding to a storage structure of files and directories stored in the user data region, based on the identifier allocated to the upper directory included in each of the first information and the at least one second information.

The first information may be stored as at least one file in the user data region.

The at least one instruction may instruct the at least one processor to, in response to receiving the request, access the first information stored in the memory without accessing metadata information stored in a metadata region of the file system, and display the size of the file or directory.

The at least one instruction may instruct the at least one processor to receive a request to mount the file system and, in response to receiving the request to mount the file system, identify the first information in data structure information which is stored in the user data region of the file system and includes the first information, and in response to the identification of the first information, determine whether the first information corresponds to the size of the file or directory corresponding to the first information.

The at least one instruction may instruct the at least one processor to, when the first information does not correspond to the size of the file or directory corresponding to the first information, change the first information, based on the size of the file or directory corresponding to the first information.

The at least one instruction may instruct the at least one processor to determine whether the size of the file or directory is changed, change the first information stored in the memory, based on the changed size of the file or directory, and change at least one second information associated with at least one upper directory of the file or directory, based on the changed size of the file or directory, wherein the at least one second information may include information indicating a sum of the sizes of all subdirectories and all files included in the at least one upper directory.

The at least one instruction may instruct the at least one processor to determine whether a request to add a new file has occurred, generate second information including information indicating the size of the new file, identify at least one third information associated with at least one upper directory including the new file, and change the at least one third information, based on the size of the new file, wherein the at least one third information may include information indicating a sum of the sizes of all subdirectories and all files included in the at least one upper directory.

As described above, according to an embodiment, a method for an electronic device may include an operation of receiving a request for access to a file or directory stored in a user data region of a file system included in a storage, an operation of, in response to receiving the request, storing, in a memory of the electronic device, first information associated with the file or directory stored in the user data region, and an operation of displaying the size of the file or directory using the first information stored in the memory. The first information may include, when the first information is information associated with the file, information indicating the size of the file, and include, when the first information is information associated with the directory, information indicating a sum of the sizes of all subdirectories and all files included in the directory.

The first information may further include an identifier allocated to the file or directory and an identifier allocated to an upper directory of the file or directory.

The operation of storing the first information in the memory may include an operation of storing the first information together with at least one second information associated with at least one upper directory of the file or directory, wherein the at least one second information may include information indicating a sum of the sizes of all subdirectories and all files included in the at least one upper directory, an identifier allocated to the at least one upper directory, and an identifier allocated to an upper directory of the at least one upper directory.

The first information and the at least one second information may be connected in a tree structure corresponding to a storage structure of a file and directory stored in the user data region, based on the identifier allocated to the upper directory included in each of the first information and the at least one second information.

The first information may be stored as at least one file in the user data region.

The operation of displaying the size of the file or directory may include an operation of, in response to receiving the request, accessing the first information stored in the memory without accessing metadata information stored in a metadata region of the file system, and an operation of displaying the size of the file or directory.

The method may further include an operation of receiving a request to mount the file system, an operation of, in response to receiving the request to mount the file system, identifying the first information in data structure information which is stored in the user data region of the file system and includes the first information, and an operation of, in response to the identification of the first information, determining whether the first information corresponds to the size of the file or directory corresponding to the first information.

The method may further include an operation of changing the first information, based on the size of the file or directory corresponding to the first information, when the first information does not correspond to the size of the file or directory corresponding to the first information.

The method may further include an operation of determining whether the size of the file or directory is changed, an operation of changing the first information stored in the memory, based on the changed size of the file or directory, and an operation of changing at least one second information associated with at least one upper directory of the file or directory, based on the changed size of the file or directory, wherein the at least one second information may include information indicating a sum of the sizes of all subdirectories and all files included in the at least one upper directory.

The method may further include an operation of determining whether a request to add a new file has occurred, an operation of generating second information including information indicating the size of the new file, an operation of identifying at least one third information associated with at least one upper directory including the new file, and an operation of changing the at least one third information, based on the size of the new file, wherein the at least one third information may include information indicating a sum of the sizes of all subdirectories and all files included in the at least one upper directory.

Methods of embodiments mentioned in the claims or specification of the present disclosure may be implemented in the form of hardware, software, or a combination of hardware and software.

When the methods are implemented by software, a computer-readable storage media storing one or more programs (software modules) may be presented. The one or more programs stored in the computer-readable storage media are configured to be executable by one or more processors within an electronic device. The one or more programs include instructions for instructing the electronic device to execute the methods of the embodiments stated in the claims or specification of the present disclosure.

These programs (i.e., software modules and/or software) may be stored in a RAM, a non-volatile memory including a flash memory, a ROM, an electrically erasable programmable ROM (EEPROM), a magnetic disc storage device, a CD-ROM, digital versatile discs (DVDs), an optical storage device of another form, and/or a magnetic cassette. Alternatively, the programs may be stored in a memory that is constructed in combination of some of them or all. Also, each constructed memory may be included in the plural as well.

The program may be stored in an attachable storage device that may access via a communication network such as Internet, an intranet, a LAN, a wireless LAN (WLAN) or a storage area network (SAN), or a communication network constructed in combination of them. This storage device may be connected to a device performing an embodiment of the present disclosure via an external port. A separate storage device on the communication network may be connected to the device performing the embodiment of the present disclosure as well.

In the aforementioned embodiments of the disclosure, a constituent element included in the disclosure has been expressed in a singular form or a plural form according to a proposed concrete embodiment. However, the expression of the singular form or plural form is selected suitable to a given situation for description convenience's sake, and the present disclosure is not limited to singular or plural constituent elements. Even if a constituent element is expressed in the plural form, the constituent element may be constructed in the singular form, or even if a constituent element is expressed in the singular form, the constituent element may be constructed in the plural form.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed:

1. An electronic device, comprising:
   a non-volatile storage including a file system;

a volatile memory distinct from the storage; and
a processor,
wherein the memory stores at least one instruction, which when executed, instructs the processor to:
receive a request for access to at least one of a file or a directory stored in a user data region of the file system;
in response to receiving the request, store, in the memory, first information associated with the at least one of the file or the directory stored in the user data region;
display a size of the at least one of the file or the directory using the first information stored in the memory,
determine whether the size of the at least one of the file or the directory is changed;
change the first information stored in the memory, based on the changed size of the at least one of the file or the directory; and
change at least one second information associated with at least one upper directory of the at least one of the file or the directory, based on the changed size of the at least one of the file or the directory,
wherein, when the first information is associated with the file, the first information indicates the size of the file,
wherein, when the first information is associated with the directory, the first information indicates a sum of sizes of all subdirectories included in the directory and sizes of all files included in the directory, and
wherein the at least one second information comprises information indicating a sum of sizes of all subdirectories and all files included in the at least one upper directory.

2. The electronic device of claim 1, wherein the first information comprises an identifier allocated to the at least one of the file or the directory, and an identifier allocated to the at least one upper directory of the at least one of the file or the directory.

3. The electronic device of claim 2, wherein the at least one instruction further instructs the processor to, in response to receiving the request, store the first information together with the at least one second information associated with the at least one upper directory of the at least one of the file or the directory, and
wherein the at least one second information comprises information indicating the sum of the sizes of the all subdirectories and the all files included in the at least one upper directory, an identifier allocated to the at least one upper directory, and an identifier allocated to an upper directory of the at least one upper directory.

4. The electronic device of claim 3, wherein the first information and the at least one second information are connected in a tree structure corresponding to a storage structure of the at least one of the file and the directory stored in the user data region, based on the identifier allocated to the at least one upper directory in each of the first information and the at least one second information.

5. The electronic device of claim 1, wherein the first information is stored as at least one file in the user data region.

6. The electronic device of claim 1, wherein the at least one instruction further instructs the processor to, in response to receiving the request, access the first information stored in the memory without accessing metadata information stored in a metadata region of the file system, and display the size of the at least one of the file or the directory.

7. The electronic device of claim 1, wherein the at least one instruction further instructs the processor to:
receive a request to mount the file system;
in response to receiving the request to mount the file system, identify the first information from data structure information that is stored in the user data region of the file system and comprises the first information; and
in response to identifying the first information, determine whether the first information corresponds to the size of the at least one of the file or the directory corresponding to the first information.

8. The electronic device of claim 7, wherein the at least one instruction further instructs the processor to, when the first information does not correspond to the size of the at least one of the file or the directory corresponding to the first information, change the first information, based on the size of the at least one of the file or the directory corresponding to the first information.

9. The electronic device of claim 2, wherein the at least one instruction further instructs the processor to:
determine whether a request to add a new file has occurred;
generate second information comprising information indicating size of the new file;
identify at least one third information associated with at least one upper directory comprising the new file; and
change the at least one third information, based on the size of the new file, and
wherein the at least one third information comprises information indicating a sum of sizes of all subdirectories and all files included in the at least one upper directory.

10. A method for an electronic device, the method comprising:
receiving a request for access to at least one of a file or a directory stored in a user data region of a file system, included in a non-volatile storage, of the electronic device;
in response to receiving the request, storing, in a volatile memory of the electronic device, first information associated with the at least one of the file or the directory stored in the user data region;
displaying a size of the at least one of the file or the directory using the first information stored in the memory,
determining whether the size of the at least one of the file or the directory is changed;
changing the first information stored in the memory, based on the changed size of the at least one of the file or the directory;
changing at least one second information associated with at least one upper directory of the at least one of the file or the directory, based on the changed size of the at least one of the file or the directory, and
wherein, when the first information is associated with the file, the first information indicates the size of the file,
wherein, when the first information is associated with the directory, the first information indicates a sum of sizes of all subdirectories included in the directory and sizes of all files included in the directory,
wherein the at least one second information comprises information indicating a sum of the sizes of all subdirectories and all files included in the at least one upper directory.

11. The method of claim 10, wherein displaying the size of the at least one of the file or the directory comprises, in response to receiving the request, accessing the first information stored in the memory without accessing metadata information stored in a metadata region of the file system, and displaying the size of the at least one of the file or the directory.

12. The method of claim 10, further comprising:
receiving a request to mount the file system;
in response to receiving the request to mount the file system, identifying the first information from data structure information which is stored in the user data region of the file system and comprises the first information; and
in response to identifying the first information, determining whether the first information corresponds to the size of the at least one of the file or the directory corresponding to the first information.

13. The method of claim 10, further comprising:
determining whether a request to add a new file has occurred;
generating second information comprising information indicating size of the new file;
identifying at least one third information associated with at least one upper directory comprising the new file; and
changing the at least one third information, based on the size of the new file,
wherein the at least one third information comprises information indicating a sum of the sizes of all subdirectories and all files included in the at least one upper directory.

14. The method of claim 10, wherein the first information further comprises an identifier allocated to the at least one of the file or the directory, and an identifier allocated to the at least one of the upper directory of the at least one of the file or the directory.

15. The method of claim 14, wherein storing the first information comprises storing the first information together with at least one second information associated with the at least one upper directory of the at least one of the file or the directory, and
wherein the at least one second information comprises information indicating the-a sum of sizes of the all subdirectories and the all files included in the at least one upper directory, an identifier allocated to the at least one upper directory, and an identifier allocated to an upper directory of the at least one upper directory.

16. The method of claim 15, wherein the first information and the at least one second information are connected in a tree structure corresponding to a storage structure of the at least one of the file and the directory stored in the user data region, based on the identifier allocated to the at least one upper directory comprised in each of the first information and the at least one second information.

17. The method of claim 10, wherein the first information is stored as at least one file in the user data region.

18. The method of claim 12, further comprising changing the first information, based on the size of the at least one of the file or the directory corresponding to the first information, when the first information does not correspond to the size of the at least one of the file or the directory corresponding to the first information.

* * * * *